(12) United States Patent
Ma et al.

(10) Patent No.: US 8,164,888 B2
(45) Date of Patent: Apr. 24, 2012

(54) COMPUTER

(75) Inventors: Xiao-Feng Ma, Shenzhen (CN); Lei Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 278 days.

(21) Appl. No.: 12/580,269

(22) Filed: Oct. 16, 2009

(65) Prior Publication Data

US 2011/0063789 A1 Mar. 17, 2011

(30) Foreign Application Priority Data

Sep. 16, 2009 (CN) .......................... 2009 1 0307090

(51) Int. Cl.
*G06F 1/16* (2006.01)

(52) U.S. Cl. ................ 361/679.21; 312/249.9; 435/124; 439/488

(58) Field of Classification Search .................. 439/173, 439/350, 578, 625, 488, 63, 710; 361/679.02, 361/679.41, 679.01, 679.49, 679.46, 679.27, 361/679.55, 679.31, 679.48, 679.58, 679.56; 312/223.3, 249.9, 107.5, 196; 435/379, 285.1, 435/91.2, 124, 91.41, 320.1

See application file for complete search history.

(56) References Cited

U.S. PATENT DOCUMENTS

| | | | |
|---|---|---|---|
| 2007/0285878 A1* | 12/2007 | Konno et al. | ................. 361/679 |
| 2009/0212671 A1* | 8/2009 | Clark et al. | .................... 312/209 |
| 2009/0225508 A1* | 9/2009 | Daley, III | ................. 361/679.27 |

* cited by examiner

*Primary Examiner* — Hung Duong
(74) *Attorney, Agent, or Firm* — Altis Law Group, Inc.

(57) ABSTRACT

A computer having a mounting structure can be easily mounted to a wall. A bracket of the computer can receive a computer enclosure of the computer and easily mount a display and the computer enclosure of the computer to the wall.

10 Claims, 4 Drawing Sheets

COMPUTER

BACKGROUND

1. Technical Field

The present disclosure relates to computers, and particularly to a computer having a mounting structure for easily mounting to a wall.

2. Description of Related Art

Computers mounted to walls have become increasingly popular for general use. When mounting a computer to a wall, mounting members, such as screws, are provided to mount a surface opposite from a display of the computer to the wall, and a computer enclosure of the computer is supported on the surface. However, the surface of the computer is not easy to be installed on the wall and can take up a great amount of space.

DETAILED DESCRIPTION

Figure 1:
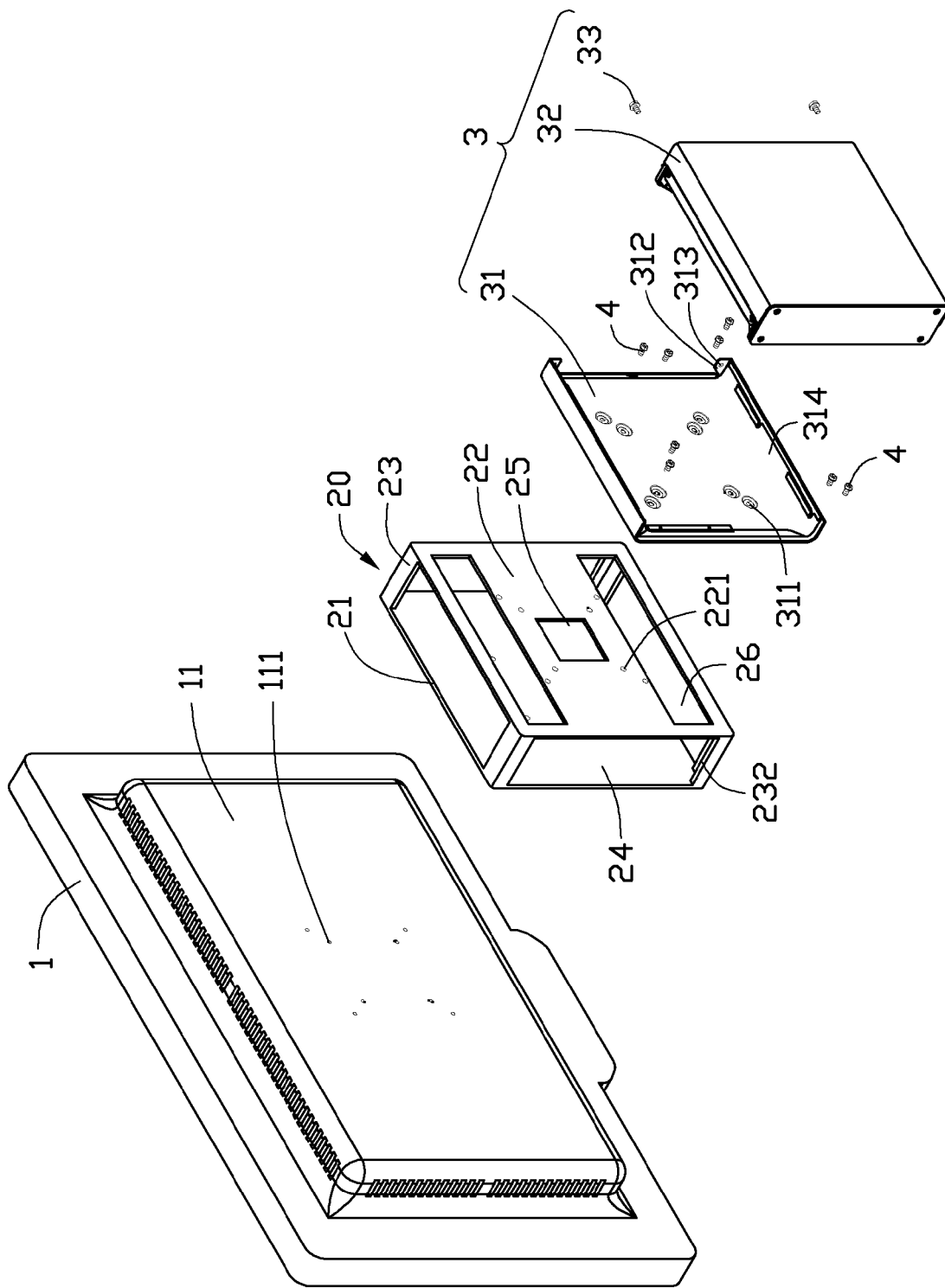
FIG. 1 is an exploded, isometric view of an exemplary embodiment of a computer.
Figure 2:
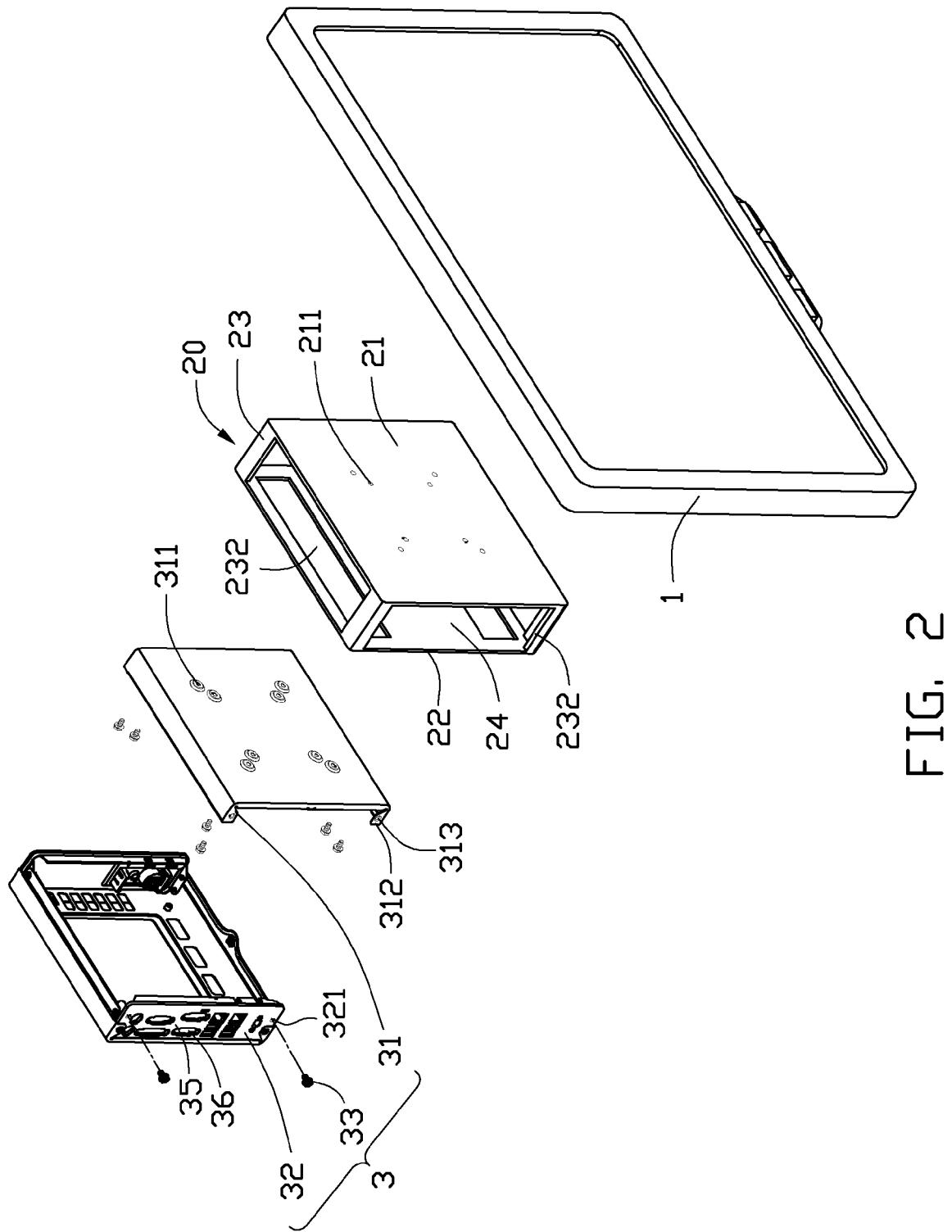
FIG. 2 is similar to FIG. 1, but viewed from another perspective.

Referring to FIGS. 1 and 2, a first exemplary embodiment of a computer includes a display 1, a bracket 20, and a computer enclosure 3 for housing various components of the computer.

The display 1 includes a rear cover 11. Eight assembly holes, such as screw holes 111, are defined in center of the rear cover 11, to mount the bracket 20. The screw holes 111 are located on two perpendicular straight lines, respectively. In other embodiments, the number of the screw holes 111 can be changed, and the screw holes 111 can be located in other places of the rear cover 11.

The bracket 20 is substantially rectangular-shaped, and includes a first panel 21 and a second panel 22 parallel and opposite to each other, and four side panels 23 perpendicularly coupled between corresponding sides of the first panel 21 and the second panel 22. The first panel 21, the second panel 22, and the side panels 23 bound a receiving space 24. A rectangular-shaped opening 232 is defined in each side panel 23. Eight fixing holes 211 are defined in the first panel 21, corresponding to the screw holes 111 of the rear cover 11. Two rectangular-shaped openings 26 are defined in an upper portion and a lower portion of the second panel 22, respectively. A square-shaped opening 25 is defined in the second panel 22, located between the openings 26. Eight mounting holes, such as screw holes 221, are defined in the second panel 22, around the opening 25 on two perpendicular straight lines. In other embodiments, the number of the screw holes 221 can be changed, and the screw holes 221 can be located at other places of the second panel 22.

The computer enclosure 3 includes a side cover 31, and a main body 32. Two parallel flanges 314 extend from a top and a bottom of the side cover 31, respectively. Two tabs 312 are perpendicularly formed on each flange 314, adjacent to a side of the side cover 31. A through hole 313 is defined in each tab 312. Eight fastening holes 311 are defined in center of the side cover 31, corresponding to the fixing holes 211 of the first panel 21 of the bracket 20. The main body 32 accommodates a motherboard, and a plurality of electronic components. The main body 32 includes a sidewall 35 for mounting a plurality of connectors 36. Two screw holes 321 are defined in the sidewall 35, corresponding to the through holes 313 of the tabs 312.

Figure 3:
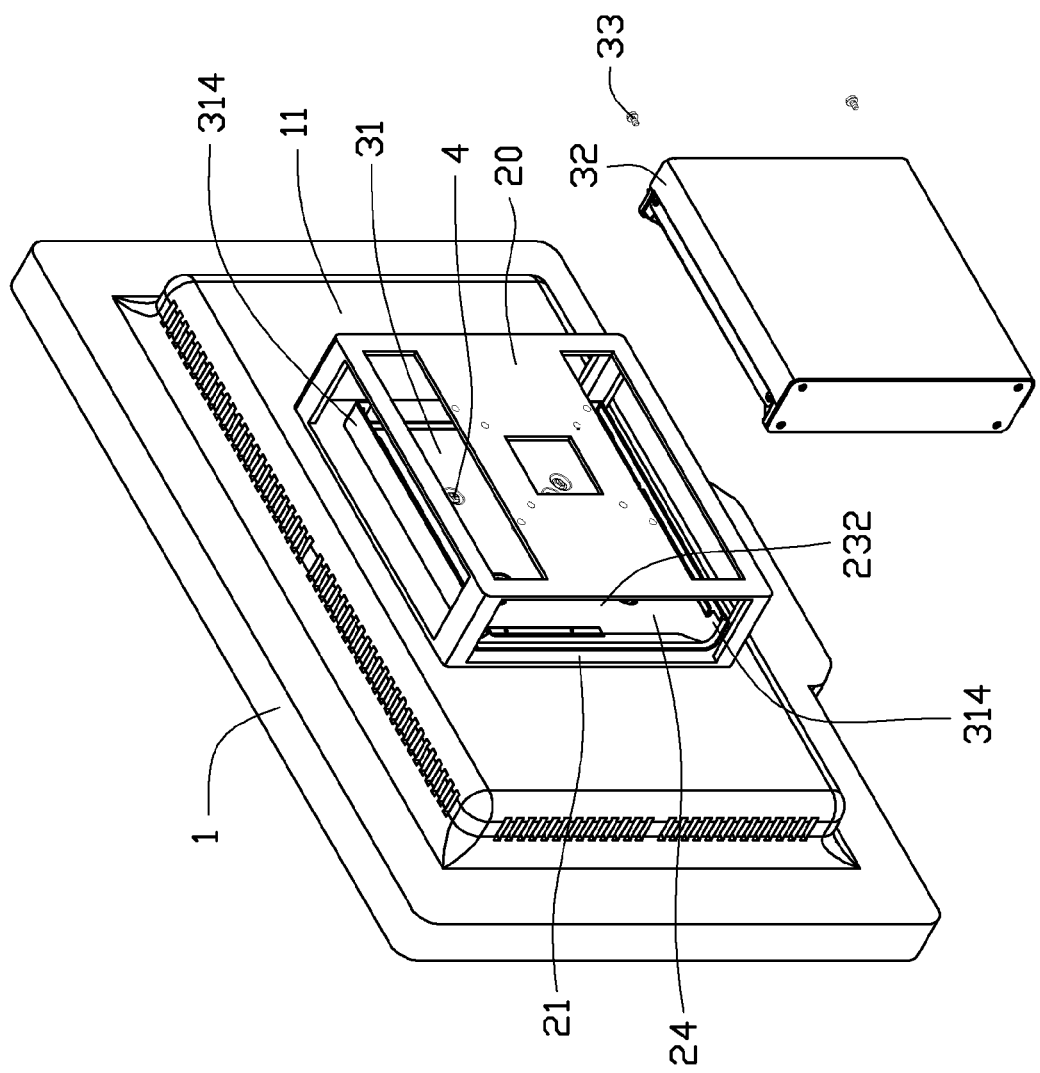
FIG. 3 is a partially assembled, isometric view of the computer of FIG. 1.
Figure 4:
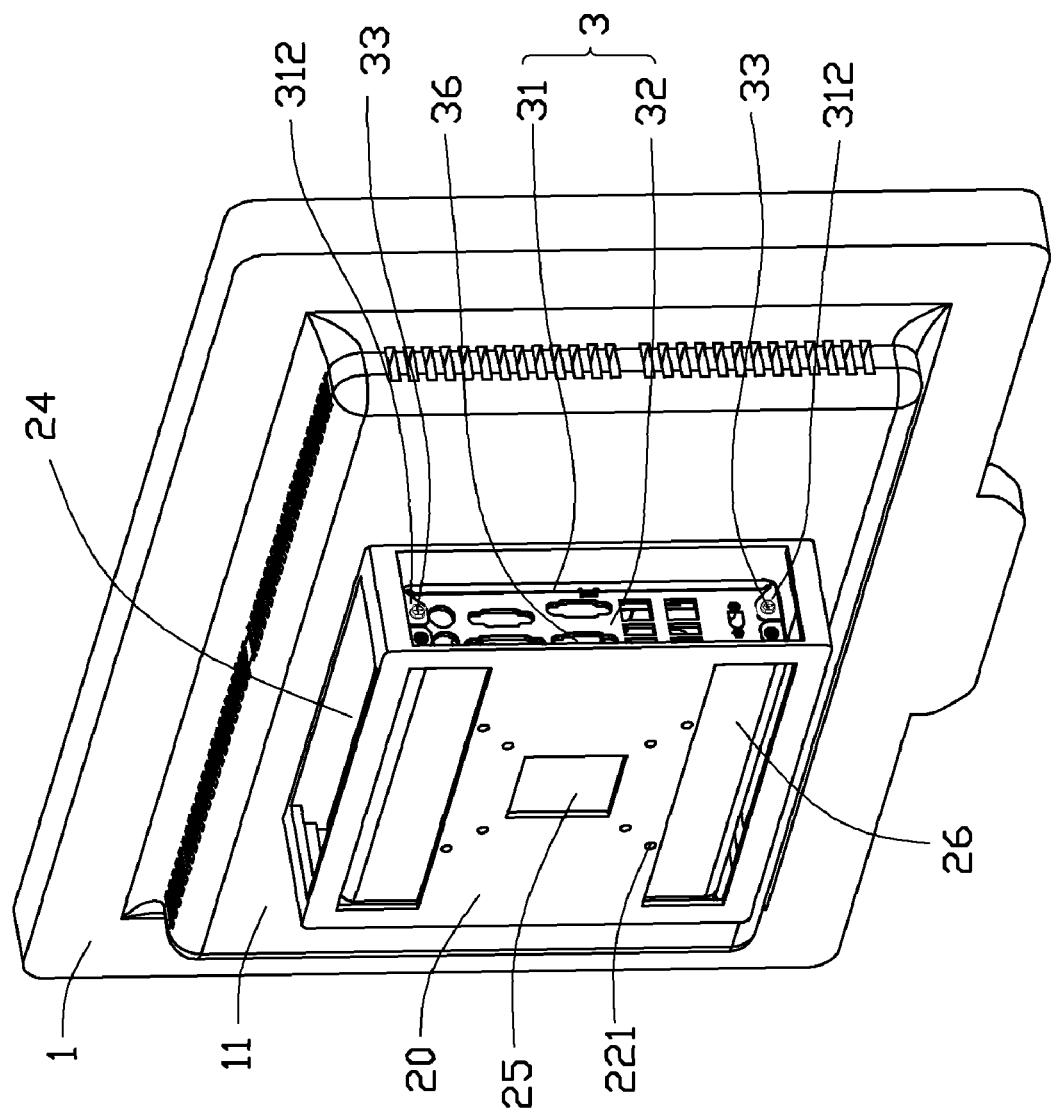
FIG. 4 is an assembled, isometric view of the computer of FIG. 1, but viewed from another perspective.

Referring to FIGS. 3 and 4, in assembly, the first panel 21 of the bracket 20 resists against the rear cover 11 of the display 1, with the fixing holes 211 of the first panel 21 aligned with the screw holes 111 of the rear cover 11. The side cover 31 of the computer enclosure 3 is placed in the receiving space 24 of the bracket 20, through an corresponding opening 232 at a left side or a right side of the bracket 20, with the fastening holes 311 of the side cover 31 aligned with the fixing holes 211 of the first panel 21. Mounting members, such as screws 4 pass through the fastening holes 311 of the side cover 31 and the fixing holes 211 of the first panel 21, and engage in the screw holes 111 of the display 1, to mount the bracket 20 and side cover 31 to the rear cover 11 of the display 1.

The main body 32 of the computer enclosure 3 is placed in the receiving space 24 of the bracket 20 and between the flanges 314, through a corresponding opening 232 towards the tabs 312 of the side cover 31. Screws 33 pass through the through holes 313 of the tabs 312 and engage in the screw holes 321 of the main body 32, to mount the main body 32 to the side cover 31, with the sidewall 35 with the connectors 36 of the computer enclosure 3 bared through a corresponding opening 232 of the bracket 20. Screws (not shown) pass through holes of a mounting bracket of a wall (not shown) and the screw holes 221 of the second panel 22 of the bracket 20, to mount the computer to the wall. The openings 25, 26, and 232 of the bracket 20 can dissipate heat for the computer enclosure 3. In other embodiments, the second panel 22 can define through holes, the mounting bracket of the wall can define corresponding screw holes, for mounting the bracket 20 to the wall by screws.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A computer comprising:
    a display comprising a rear cover;
    a computer enclosure; and
    a bracket defining a receiving space for receiving the computer enclosure, and the bracket operable of being mounted between the rear cover of the display and a wall, wherein the bracket comprises a first panel mounted to the rear cover of the display, a second panel parallel to the first panel and operable of being mounted to the wall, and a plurality of side panels perpendicularly coupled between corresponding sides of the first panel and the second panel, and the receiving space is bounded by the first panel, the second panel, and the side panels.

2. The computer of claim 1, wherein an opening is defined in each side panel, fixing holes are defined in the first panel, assembly holes are defined in the rear cover of the display corresponding to the fixing holes, the computer enclosure comprises a side cover, fastening holes are defined in the side cover, the side cover of the computer enclosure is placed in the receiving space through the opening of the bracket, mounting members pass through the fastening holes of the side cover and the fixing holes of the first panel, and engage in the assembly holes of rear cover of the display, to mount the first panel and the side cover to the rear cover of the display.

3. The computer of claim 2, wherein two parallel flanges extend from a top and a bottom of the side cover, two tabs are perpendicularly formed on each flange, adjacent to a side of the side cover, wherein the computer enclosure further comprises a main body, the main body comprises a sidewall mounted with a plurality of connectors, two screw holes are defined in the sidewall, the main body of the computer enclosure is placed between the flanges and disposed adjacent to the tabs of the side cover, two mounting members pass through the through holes of the tabs and the screw holes of the sidewall of the main body, to mount the main body to the side cover, with the sidewall mounted with the plurality of connectors bared through a corresponding opening of the bracket.

4. The computer of claim 1, wherein a plurality of mounting holes are defined in the second panel, to mount the bracket to the wall.

5. The computer of claim 1, wherein a plurality of heat dissipating openings are defined in the second panel, to dissipate heat for the computer enclosure.

6. A bracket for mounting a display comprising a rear cover and a computer enclosure to a wall, the bracket comprising:
a first panel to be mounted to the rear cover of the display;
a second panel parallel to the first panel, to be mounted to the wall;
a receiving space located between the first and second panels, for receiving the computer enclosure; and
a plurality of side panels perpendicularly coupled between corresponding sides of the first panel and the second panel, wherein the receiving space is further bounded by the first panel, the second panel, and the side panels.

7. The bracket of claim 6, wherein an opening is defined in each side panel, fixing holes are defined in the first panel, for mounting the computer enclosure and/or mounting the first panel to the rear cover of the display.

8. The bracket of claim 6, wherein mounting holes are defined in the second panel, to mount the bracket to the wall.

9. The bracket of claim 6, wherein a plurality of heat dissipating openings are defined in the second panel, to dissipate heat for the computer enclosure.

10. A bracket for mounting a display comprising a rear cover and a computer enclosure to a wall, the bracket comprising:
a first panel to be mounted to the rear cover of the display;
a second panel parallel to the first panel, to be mounted to the wall; and
a receiving space located between the first and second panels, for receiving the computer enclosure;
wherein a plurality of heat dissipating openings are defined in the second panel, to dissipate heat for the computer enclosure.

* * * * *